Aug. 30, 1966     B. O. WEINSCHEL     3,270,282
PRECISION DIRECT CURRENT SUBSTITUTION
BRIDGE FOR MEASURING R.F. VALUES
Filed June 8, 1962     4 Sheets-Sheet 1

*INVENTOR*
Bruno O. Weinschel

BY    *Max L. Libman*

ATTORNEY

INVENTOR
Bruno O. Weinschel

BY  Max L. Libman
ATTORNEY

United States Patent Office 3,270,282
Patented August 30, 1966

3,270,282
PRECISION DIRECT CURRENT SUBSTITUTION BRIDGE FOR MEASURING R.F. VALUES
Bruno O. Weinschel, Bethesda, Md., assignor to Weinschel Engineering Co., Inc., Kensington, Md., a corporation of Delaware
Filed June 8, 1962, Ser. No. 201,109
5 Claims. (Cl. 324—106)

This invention relates to a bridge circuit for precision measuring of high frequency power, and has for its primary object the improvement in accuracy, ease of reading, and usable frequency range of instruments of this type.

This invention relates to a bolometer bridge using very small R.F. power levels, in the neighborhood of between 20 milliwatts down to perhaps 10 microwatts, with great precision. The invention relates to the same general type of instrument described in copending patent applications Serial No. 40,348 of Weinschel, filed July 1, 1960 (now Patent No. 3,142,017), and Serial No. 823,970 of Sorger et al, filed June 30, 1959 (now Patent No. 3,047,803). As pointed out in Patent No. 3,047,803, only D.-C. should be used for substitution power in order to eliminate the important D.-C./A.-C. error. The bias power which is usually used in bolometers is large compared with the R.F. power to be measured, and has created a problem. In order to avoid the necessity of a very accurate measurement of a small difference between two large numbers, a circuit is desired which allows measurement of the small difference directly, rather than the difference between the two large numbers. It is a major object of the present invention to provide an efficient and practical circuit and apparatus for this purpose. In this type of circuit, during the measurement, the bolometer is not used during part of the procedure. It is an important object of the invention to provide means for maintaining the thermal stability of the bolometer constant during the entire period of the testing procedure, by circuit means retaining the bolometer at substantially the same current value at all times during the test.

Commonly used bolometer mounts for connection to a coaxial cable are of the grounded type utilizing a blocking capacitor in series with the inner conductor of the coaxial input, which capacitor must necessarily be of very small size; and this limits the lower frequency range to which measurement can be extended. It is a major object of the invention to provide a new and improved bolometer mount which does not require the physically small central capacitor, and which is capable of greatly extending the range of measurements which can be made.

A further object of the invention is to provide a precision R.F. power bridge of the substitution type in which the initial voltage values can be set on potentiometers directly calibrated in volts, thus simplifying the use of the instrument and minimizing the calculations required.

A further object is to provide means for reducing error effects due to 60 cycle leakage current from the commercial power source into which the instrument is plugged.

A further advantage is to increase the efficiency of the bolometer mount by a special construction which is made possible by the elimination of the central blocking condenser.

The specific nature of the invention, as well as other objects and advantages thereof, will clearly appear from a description of a preferred embodiment as shown in the accompanying drawings, in which.

Figure 1:
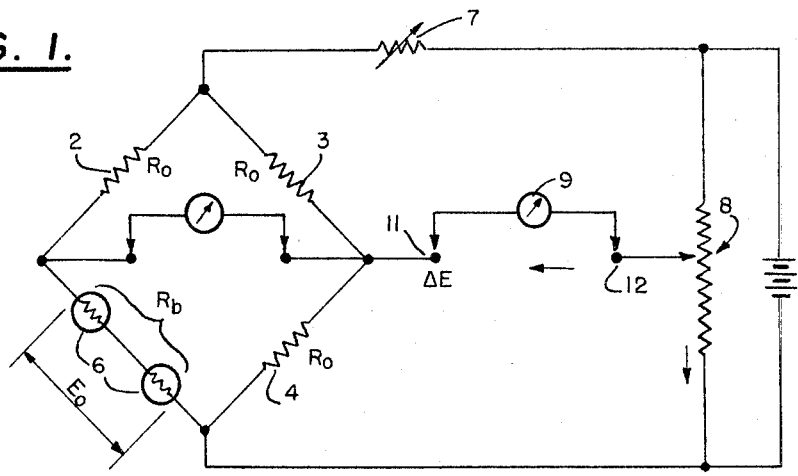
FIG. 1 is a simplified schematic diagram showing the essential principle of the invention.

Referring to FIG. 1, it will be found that actually two bridge circuits are incorporated in the diagram shown in this figure. One is the actual bolometer bridge consisting of the three resistors 2, 3, and 4, usually made equal, and of a resistance value which will be termed $R_o$. In a practical instrument, $R_o$ is often 200 ohms. Two thermistors in series constitute the fourth arm of the bridge, 6. It is convenient, because of the size of the thermistors commercially available, to use two 100 ohm thermistors in series for arm 6 of the bridge, when the other arms are 200 ohm resistors. The second bridge consists of a bridge branch containing the adjusting resistor 7 and the two upper resistors 2 and 3, another bridge branch comprising resistors 4 and 6, and the remaining two arms being constituted by the upper and lower portions of potentiometer 8 respectively. The present invention therefore makes use of a bridge in which voltages can be measured directly rather than making current measurements through a standard resistor, as is done in some prior art devices. When the bridge in FIG. 1 is in balance, a certain bias power is required to bias the thermistor 6 (by raising its temperature) so that its resistance $R_b$ is equal to the resistance $R_o$, or typically 200 ohms. This bias power, in a typical thermistor, is about 300 milliamperes. When this D.-C. bias power is applied to the bridge, a D.-C. voltage $E_0$ will develop across the bolometer resistance. Therefore, the bias power into the bolometer equals $E_0^2/Rb$. Since the bridge is brought into balance with this bias power, $R_b$ at this instant is equal to $R_o$, so the bias power at that moment is $P=E_0^2/R_o$. If R.F. power is now fed into the bolometer (as described in application Serial No. 823,970), the bias power must now be reduced to bring the bridge back into balance. Thence the R.F. power will tend to increase the temperature of the bolometer, thereby changing its resistance. In order to bring the temperature back to its original value, the D.-C. bias power must now be reduced. Assuming that R.F. power and D.-C. power have the same heating effect, then the D.-C. power which must be removed to bring the bridge back into balance should then be exactly equal to the R.F. power. The new voltage which is now across the bolometer is smaller than the original D.-C. voltage and is designated as $E_1$. The bias power, after the R.F. power is applied, is equal to $E_1^2/R_o$, since the bridge is again brought into balance. Therefore, the R.F. power or the substituted power would be equal to $(E_0^2-E_1^2)$ divided by $R_o$. The problem now is to determine $(E_0^2-E_1^2)$, since $E_0$ is very close in value to $E_1$. This difference can be algebraically transformed into the product of $(E_0-E_1)$ times $(E_0+E_1)$. Since $(E_0^2-E_1^2)$ is equal to $(E_0-E_1)$ times $(E_0+E_1)$, the problem is now again to measure the difference $(E_0-E_1)$ very accurately. This is done with the second bridge circuit of FIG. 1. Without R.F. power connected, that is, when the bias power is equal to $E_0^2/R_0$, the potentiometer 8 is now adjusted by placing a galvanometer 9 across points 11 and 12, and setting the potentiometer until this galvanometer shows zero. This means that the voltage across the lower portion of the potentiometer 8 is equal to $E_0$. Now, if R.F. power is applied to the bridge and the bias power is changed to $E_1^2/R_0$, where $E_1$ is smaller than $E_0$, and the galvanometer is connected to points 11 and 12, then since the bridge is in balance and the voltage across $R_b$ is exactly equal to the voltage across $R_0$, the voltage difference between the points 12 and 11 must equal $(E_1-E_0)$. Therefore, by placing the potentiometer 9 across points 11 and 12, this voltage $\Delta E$ which equals $(E_0-E_1)$ can be measured very accurately. The voltage sum $(E_0+E_1)$ can also be measured quite accurately, but this, being a relatively large value, has less effect upon the accuracy of the result. If $\Delta E$ is equal to $(E_0-E_1)$, the performance formula for the substituted power can be modified. Very simply, $(E_0-E_1)$ is replaced by $\Delta E$ and $(E_0+E_1)$ is replaced by $(2E-\Delta E)$, by algebraic substitution; thus, the substituted power equals $\Delta E$ times $(2E_0-\Delta E)$ divided by $R_0$. Therefore, by measuring the voltage difference between $E_0$ and $E_1$ with the R.F. voltage applied, and by remembering what $E_0$ was initially, this power can be calculated very accurately. The entire measurement now does not rely upon a difference measurement, but does rely upon the product of two voltage measurements. This principle is employed in the present invention, and also in copending application Serial No. 40,348, previously referred to.

Figure 2:
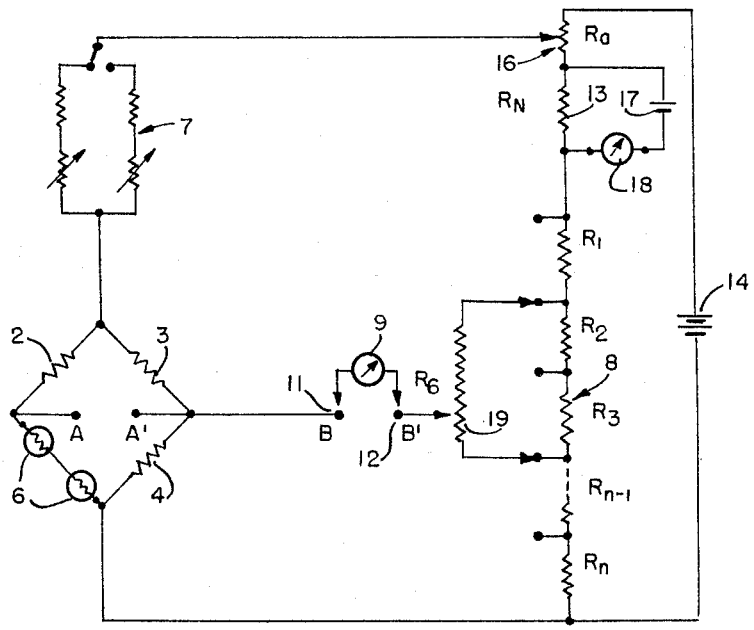
FIG. 2 is a somewhat more detailed, but still simplified, circuit diagram of the same invention shown in FIG. 1.

In order to make the system easier to use, the potentiometer 8 is laid out so that it is calibrated by itself in volts directly so that no other voltage measuring means need be employed. This is done as shown in FIG. 2, which is a simplified diagram of the complete schematic diagram given in FIG. 4. In order to directly calibrate the potentiometer 8 of FIG. 1, a standard resistance 13, the value of which will be taken as $R_N$, is placed into the circuit, and a D.-C. current applied from battery 14, which represents any D.-C. power source. The D.-C. current can be varied by potentiometer 16 of assumed value $R_a$. This varies the current through resistor 13 and the series voltage divider 8. The current is now adjusted until the value of a standard cell 17 is equal to the voltage drop across resistance 13. This equality is indicated by placing a galvanometer 18 in the circuit as indicated. With this current now established, the resistors $R_1, R_2 \ldots R_N$ of potentiometer 8 are now selected in such a way that, for this given value of current, a voltage drop of 0.1 volt will be developed across each adjacent two of them provided that the potentiometer 19 is placed across the two resistors. A potentiometer circuit having this relationship is known as the "Varley-Kelvin" circuit, and has the advantage that two or three voltage dividers can be hung together without the impedance of the next voltage divider being $1/N$ of the impedance of the first one. By using this circuit, the voltage $E_0$ can be established to an accuracy of approximately 0.05 percent. This accuracy is obtained without the use of any external potentiometer. The resistors $R_1, R_2 \ldots R_N$ are calibrated in volts directly, and this can be seen in the main schematic diagram of FIG. 4, where the second voltage divider 21 is similarly connected across two points of divider 19. A voltage difference of 0.1 volt is always established across the second voltage divider 19, and the third voltage divider 21, which is a potentiometer then covers the range of 0.01 volt. By this means at least four significant digits can readily be obtained, the values of which can be read directly from scales associated with the movable potentiometer element. Thus, by setting the galvanometer 9 between points 11 and 12 to zero by means of this voltage divider arrangement, the value of $E_0$ is immediately displayed on direct readable scales, and since this setting is not changed during the measurement, the operator can subsequently read $E_0$ directly from the potentiometer dial (in practice, a rotary potentiometer is usually employed) after the measurement is completed, and does not have to remember it. The voltage difference, $\Delta E$, is usually measured by placing potentiometer 9 across terminals 11, 12 and measuring this voltage by potentiometric means.

The bridge shown is not only useful in making R.F. power measurements, but is also useful in establishing certain R.F. power levels. The unit can thus be used as an R.F. power standard. This is typically done in the following way: First, without R.F. power applied, the initial bridge balance is established and $E_0$ is determined. The formula $$P_{\text{R-F}} = \alpha \frac{\Delta E(2E_0 - \Delta E)}{R_o}$$

where $P_{\text{R-F}}$ is the R.F. power, $\alpha$ is the "calibration factor" of the mount, and the other terms are as above identified, is now used. In this formula, $\Delta E$ is calculated for the established $E_0$ and for a given R.F. power level, usually 1 milliwatt. Then the bias power is changed, until the voltage $\Delta E$ appears across terminals 11 and 12, which is done by varying the resistor 7 in FIG. 1. This means that the D.C. bias power is now lowered by exactly, in the example assumed, $1/\alpha$ milliwatt. The R.F. power is fed into the bolometer, until the bridge is in balance again, and it is known that the R.F. power is exactly 1 milliwatt.

Figure 3:
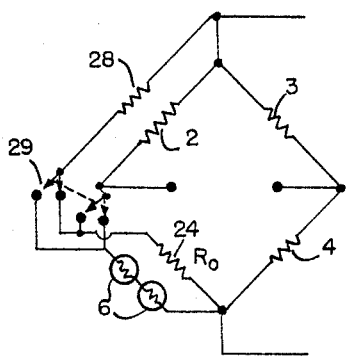
FIG. 3 is a circuit diagram of a portion of the power bridge, showing the manner of maintaining thermistor stability.
Figure 4:
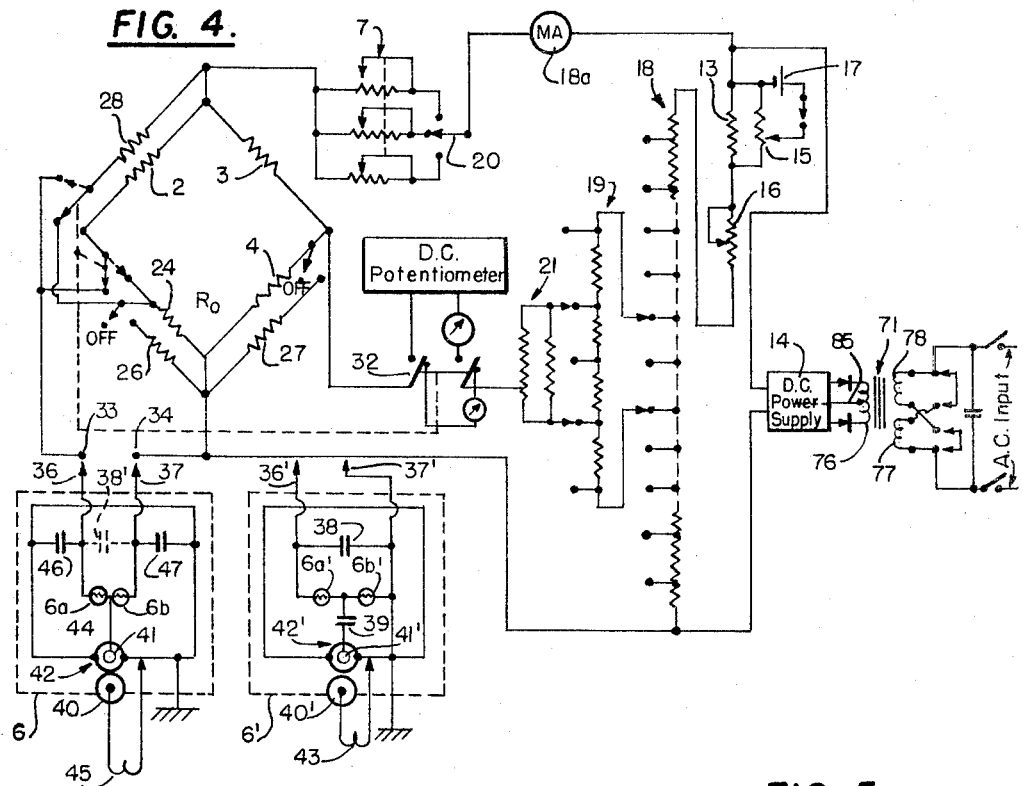
FIG. 4 is a detailed schematic circuit diagram of the invention.

In the foregoing circuit, a problem arises in that while changing the D.-C. bias power, the bolometer resistance $R_b$ will also change, and since in the beginning no R.F. power is fed in to compensate for this, the current division through the bridge will change, and therefore the $\Delta E$ which is established will not be the true $\Delta E$ since the current through the left-hand two branches of the bridge of FIG. 1 will be different from the current through the two right-hand branches. In order to avoid this, a separate resistor equal in value to $R_0$ is placed across the bolometer, which is only put into circuit when this $\Delta E$ determination is made. This resistor is shown in FIGS. 3 and 4 at 24 and in the example given, would be a 200 ohm resistor. Resistors 26, 27 are used when the bolometer resistance is not 200 ohms but 100 ohms, since some commercial bolometers are of this value, and are merely added to show a practical arrangement for this purpose.

By switching from the bolometer 6 to a 200 ohm resistor as above described, a very serious problem is created. The entire bias power is removed from the bolometer, thereby lowering its temperature, and when the measurement of R.F. power is made, and the D.-C. power is again applied to the bolometer, a long time is required for the bolometer to establish its previous temperature level. This is due to the thermal time constant of the bolometer, which may be of some minutes' duration, and it would be very annoying to have to wait for the bolometer to acquire thermal stability for such a length of time. Therefore it is desired to keep the bias power into the bolometer essentially constant even while the bolometer is taken out of the circuit and replaced by a 200 ohm resistor. This is accomplished by resistor 28, which is also a 200 ohm resistor in the above example, and is placed in the circuit so that, if the switch 29 is operated, the resistor 28 will apply bias power to the bolometer. In practice, several decks of switches are employed which are operated simultaneously when the changeover is being made, and in FIG. 4 the switches 29, 31 and 32 are shown ganged together for this purpose. The solid arrow condition of switches 29 and 31 show the bolometer 6 out of the circuit in order to establish the value of $\Delta E$. However, it is now connected through the 200 ohm resistor 28 to the bias supply in order to keep its temperature constant throughout the entire test, as explained above. When an R.F. power measurement is to be made and the bolometer connected back into the bridge again, the switches 29 and 31 are thrown to the other position indicated by the dotted arrows and the bolometer is now in the bridge circuit, resistor 28 is taken out, but in order not to offset the current distribution, resistor 24 is now connected to resistor 28 and thence to the bias supply. Therefore, the voltage across the bridge will not change, since at balance the bolometer value is substantially identical to resistance 24, which is identical to the other resistance units in the bridge.

FIG. 4 is a schematic diagram showing in more detail the circuit arrangements of a practical instrument embodying the principle described in the previous figures. Whenever applicable, the same references are used to indicate the same or corresponding circuit components. The basic circuit is the same as that described in connection with the preceding figures; the D.-C. power supply 14 (preferably transistorized) is, of course, in a practical instrument derived from available A.-C. commercial power, and it is important that the bridge and its power supply should be very carefully isolated with respect to the 60 cycle power line. This is particularly important in view of the ungrounded thermistor mount arrangement, and it is therefore necessary to take all precautions to insure maximum isolation from the power line. For example, the power transformer 71 should be designed for a minimum of capacity between the power line and the D.-C. power supply, preferably in the order of a few micromicrofarads. One such arrangement will be described in more detail below. Commercial low-capacity transformers are available which may be used for this purpose.

Figure 6:
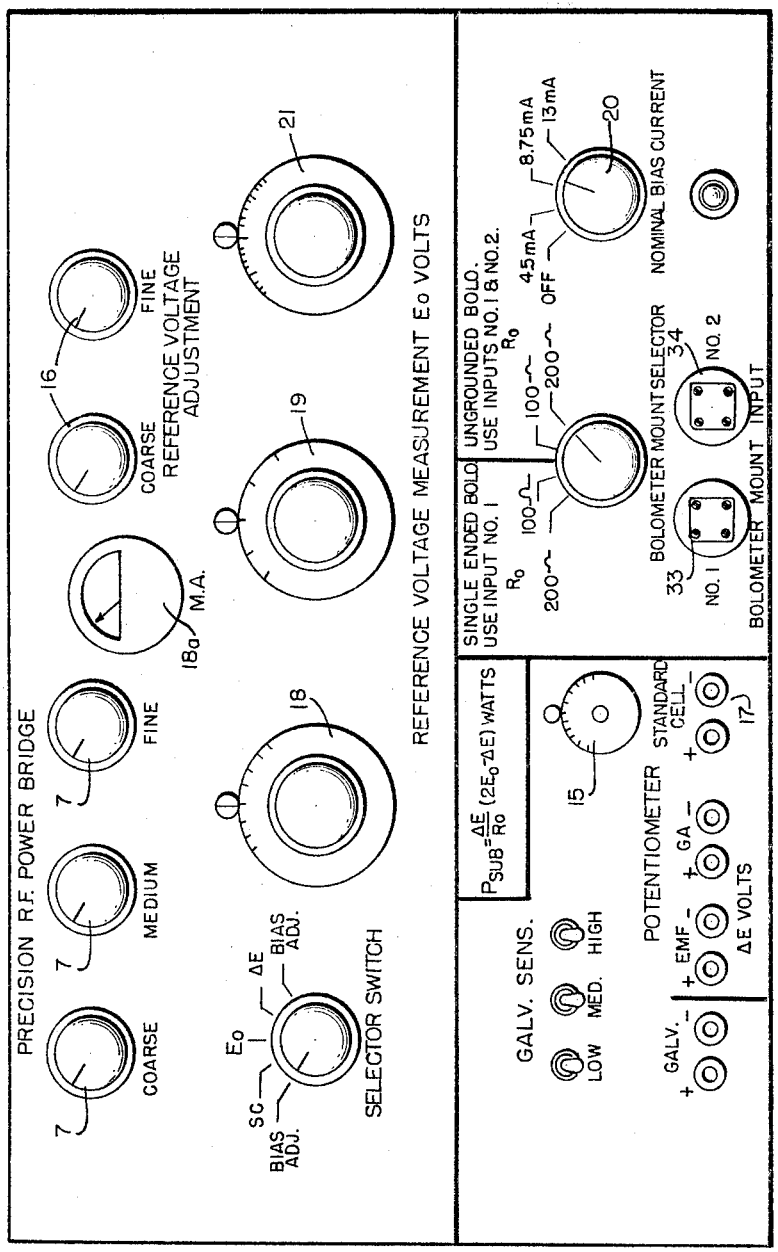
FIG. 6 is a front view of the panel of a power bridge according to the invention, showing a typical arrangement of the control dials and connection terminals.

FIG. 6 shows the front panel of a practical instrument embodying the invention, various knobs and connection points being identified by the same reference characters as in the circuit diagram of FIG. 4. It should be noted that, as previously indicated, commercially available rotary type potentiometers are used for 18, 19, and 21, and therefore it is possible to use suitably calibrated circular dials which are rotated to set the potentiometers by means of a central knob.

One advantage of the bridge, using D.-C., and above all using a bias power supply to be described later, is that grounded bolometer mounts as well as ungrounded bolometer mounts can be used. The mount which is usually used commercially is the so-called "grounded" mount, or "single-ended" mount, as shown at 6' in FIG. 4. In the general method of substitution testing, it is necessary to place the two bolometer elements in series for the substitution power and in parallel for the R.F. power, as explained in more detail in copending Patent No. 3,047,803, previously referred to. In order to avoid the flowing of any D.-C. current outside of the bolometer elements, capacitors are incorporated to cut off the D.-C. power from any of the other branches and to bypass the two bolometers so that they are in parallel for R.F. and in series for D.-C. FIG. 4 shows at 6' the schematic circuit of a bolometer mount arranged in this fashion and having D.-C. terminals 36', 37' which are arranged to be connected to terminals 33 and 34 of the bridge circuit. A different type of mount, to be described later, is shown at 6, and is arranged to be alternatively connected at terminals 36 and 37 to terminals 33 and 34. It will be seen that in the grounded mount 6' the capacitors 38 and 39 serve as above described to properly isolate the D.-C. power but to bypass the R.F. power. Capacitor 39 is in series with the center conductor 41' of coaxial connector 42', similar to that shown in FIG. 5. In using the apparatus, coaxial terminal 42' is usually connected to a coaxial line leading to a generator in which the pickup element might be a coil 43 having a very low D.-C. resistance. This means that for D.-C., the center conductor is essentially grounded. However, by eliminating capacitor 39 the D.-C. current can be made to flow through the left-hand bolometer 6a' correctly, but if a solid conductor replaces the capacitor 39, the current would entirely bypass the right-hand bolometer 6b'. The second capacitor 38 is used to provide an R.F. bypass from point 33 to ground, thereby putting the two bolometer elements in parallel for the R.F. part of the measurement. This describes the situation with respect to thermistor mounts 6', which is the presently generally used form. The difficulty with this present arrangement is that capacitor 39 affects the lower frequency limit of the operation of the power measuring equipment because it is physically in line with the center conductor of a coaxial terminal and must assume the same small physical dimensions as the center conductor of a coaxial line. It may be limited to a .125 inch in a typical case. Even with the best available dielectric materials, it is literally impossible to make a capacitor which may be of a value higher than approximately 0.1 microfarad in so small a space. This therefore limits the low frequency end of the measuring range. Capacitor 38, however, can be made physically as large as desired, since it is not restricted to the dimensions of the center conductor of a coaxial line, and can be made as large as 1 farad capacity if desired or required.

Figure 5:
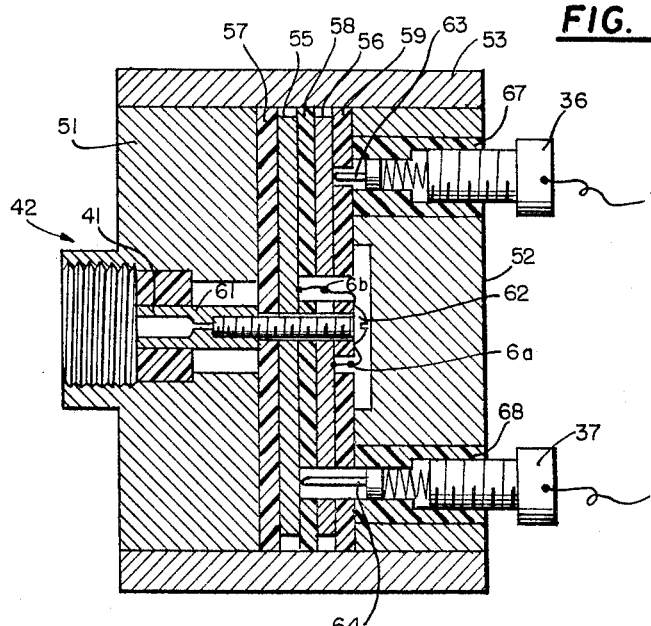
FIG. 5 is a central longitudinal cross section through an ungrounded bolometer mount according to the invention.

The thermistor mount 6 as shown in FIG. 4 as an alternative construction to that shown at 6' accomplishes the desired objective. In this case, the capacitor 39 is replaced by solid conductor 44 and capacitors 46 and 47 are added as shown. Capacitor 38 may be retained as indicated by the dotted lines at 38', but is preferably eliminated entirely. By this arrangement, both inputs from 36 and 37 (or from points 33 and 34 to which they are respectively connected) are isolated from ground, so far as D.-C. is concerned. For R.F., the two bolometer elements are grounded by the additional bypass capacitors 46 and 47, which are respectively connected between terminals 36 and 37 and ground. Since condenser 39 is eliminated, there is not return for D.-C., and both bolometers are effectively isolated from ground for direct current. This construction has the advantage that there is practically no lower frequency limit, since condensers 46 and 47 do not need to be physically limited in size by the dimensions available to the center conductor of a coaxial cable line, and the condensers can be made as large as desired for all practical purposes. A practical embodiment of a thermistor mount embodying this construction is shown in FIG. 5. In this figure, the coaxial cable connector 42 is shown as a female connector for attachment to a standard coaxial cable fitting, but could, of course, equally well be a male connector. It will be noted that the body of the mount 6 is not restricted to the diameter of the fitting, which is essentially the outer diameter of the coaxial line to which it is attached, but may be made of any desired size in order to achieve the required impedance value.

The blocks 51 and 52 constitute the main body of the thermistor mount, and are typically of brass, silver-plated for good contact. They are electrically and mechanically connected together by any suitable means, which may be screws, etc., but are shown in this instance as an outer conductive casing 53, which is in good electrical and mechanical contact with and retains blocks 51 and 52. The assembly 51, 52, 53 therefore forms the outer grounded conductor of the circuit since it is connected to the outer conductor of a coaxial cable of the R.F. power supply. The condensers 46 and 47 are formed by providing thin copper discs 55 and 56 which are insulated from the grounded outer assembly by insulating discs 57, 58, and 59 of high-grade insulating material such as Teflon or mica. In a practical device, the discs are only a few $1/1000$ of an inch thick and are spaced and designed to provide the desired capacitive value. In a practical device, additional condensers are provided, with capacities of different values, to provide a large frequency range. Since the capacity can now be made as large as desired by connecting these additional condensers externally between 33 and ground, and 34 and ground, the frequency range can be extended downward as far as desired.

Capacitor 47 is formed by the metal disc 55, insulating disc 57 and the contiguous face of block 51, which also provides the ground connection for one side of the condenser 47, as shown in FIG. 4. Thermistor 6b is connected to disc 55 to provide the connection to the other side of condenser 47 as shown in FIG. 4, and the other side of the thermistor 6b is connected to the center conductor 61 through its connection to screw 62. Thermistor 6a is similarly connected to disc 56 of condenser 46 and to the center conductor. The grounded side of condenser 46 is provided by block 52. D.-C. connectors 36 and 37 are connected through spring-pressed pins 63 and 64 respectively to discs 56 and 55 respectively, to provide the D.-C. connection shown in FIG. 4. Center pin 61 is suitably insulated by insulator 66 and pins 63 and 64 similarly insulated from the outer assembly by insulating members 67 and 68 respectively.

Essentially the same construction can be used to provide the grounded mount assembly 6' of FIG. 4, if desired, by omitting one of the disc condensers, connecting the other one as shown at 38 in FIG. 4, and adding a small central condenser in series with the center conductor 61; terminal 37 is in this case simply grounded to the outer casing. Thus the same mechanical construction can be used with very minor modifications to provide either a grounded or an ungrounded thermistor mount in accordance with the requirements of the user.

Figure 7:
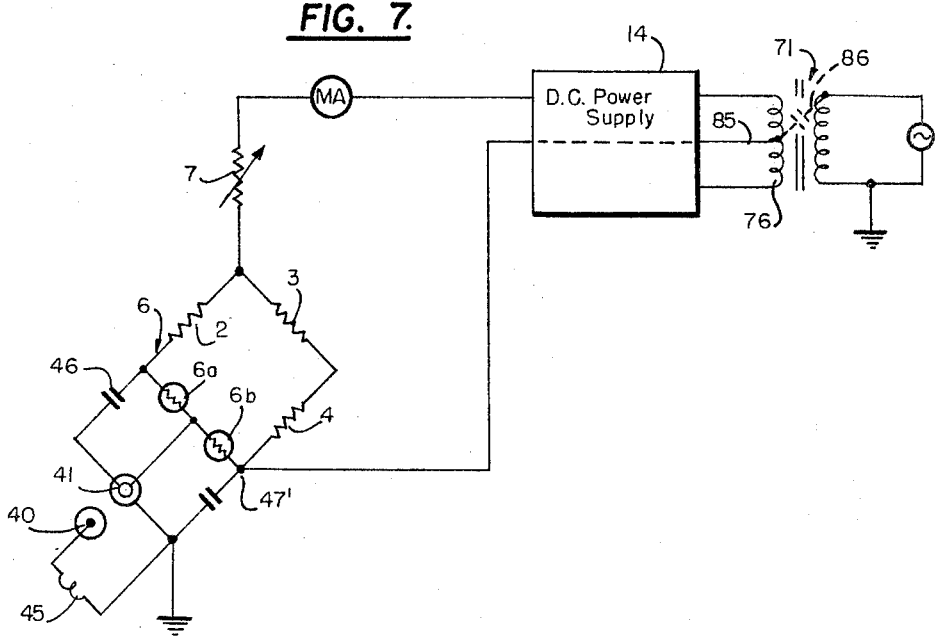
FIG. 7 is a schematic circuit of part of the apparatus showing the capacitance leakage path.

FIG. 7 shows the manner in which the capacitive coupling between the primary and secondary of transformer 71 of FIG. 4 can introduce a serious error into the measurement. The center tap line 85 of the transformer, although this is not explicitly shown in FIG. 4, is in practice effectively conductively coupled through the negligible series resistance of one of the transistors of the D.-C. power supply through the negative side of the D.-C. power supply. Using the ungrounded thermistor mount shown at 6 in FIG. 4, this in effect connects line 85 to point 47' of FIG. 7. For D.-C. or low frequency, the center connection 40 of the coaxial cable connector which is connected to the center point 41 of FIG. 4, is effectively grounded through winding 45, which is typically of a very low resistance value. The capacitors 46 and 47 are of such value that they represent a practically complete open circuit for low frequencies, but represent practically a short circuit for the microwave frequencies. As shown in FIG. 7, there is a capacitive coupling, represented in dotted lines at 86 between the ungrounded side of the primary winding of transformer 71 and the center tap of the secondary. Actually, of course, the capacity effect is distributed along the winding, but these two points are of most interest for the present purpose. This provides a current path for 60 cycles through thermistor 6b from line 85, to the center tap 40, 41 and through the winding 45 to ground. This, in effect, passes an additional bias current through only one of the two bolometer elements, namely 6b, which current depends upon the capacitive coupling represented in dotted lines. This 60 cycle current can raise the temperature of the thermistor by an appreciable amount. The stray current thus introduced can be as much as one milliampere, and may introduce an error of 5 percent or more. This current produces unbalance in the thermistors and may introduce a high V.S.W.R. at the mount input, thereby adversely affecting one important property of the mount. It also introduces a direct error in the measurement due to the presence of 60 cycle current which tends to heat thermistor 6b more than thermistor 6a, and thus introduces another error in the substituted power value.

Figure 8:
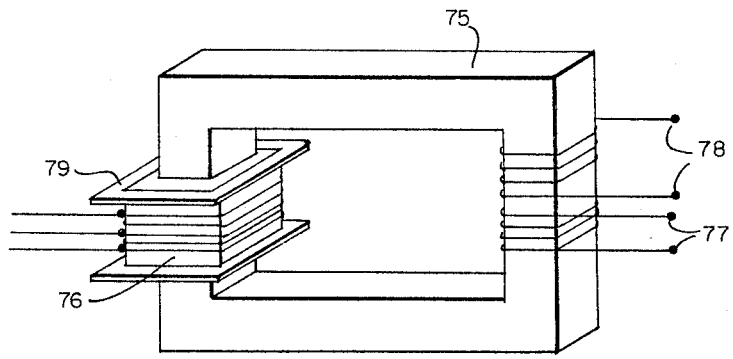
FIG. 8 is a perspective view of a low-capacitance transformer construction for reducing the leakage path.

According to the invention, this error is reduced by making use of a special transformer construction which has a very low capacitance between the primary and secondary windings. Such a transformer is shown in FIG. 8, and is made to have a low capacitance by using a long core leg 75 in order to space the secondary winding 76 from the primary windings 77 and 78. Two primary windings are shown merely in order to adapt the transformer to use with both 220 volts and 110 volts, as is well known, by using a parallel connection for 110 volts and a series connection of the two windings for 220 volts. In effect, there is a single primary winding as schematically illustrated in FIG. 7. To further decrease the capacitance, winding 76 is placed on a spool 79 of relatively large diameter compared to the core, so that it is spaced at all points from the core. If desired, a grounded conductive shield may also be placed between the primary and secondary windings, all of these expedients being well known in the art per se, and only the general concept of minimizing the transformer capacitance in order to eliminate a source of error being significant in this case.

It will be apparent that the embodiments shown are only exemplary and that various modifications can be made in construction and arrangement within the scope of my invention as defined in the appended claims.

I claim:

1. Apparatus for measuring R.F. power comprising a bridge circuit, one arm of which includes a bolometric resistor having a substantial temperature coefficient of resistivity; means for supplying D.-C. bias power to said bridge from a D.-C. source; means for adjusting the bias power from said source applied to said bridge until the bridge is in balance; voltage divider means supplied with D.-C. from the same source as the bridge and having slider means movable along the divider and providing an output voltage according to its position; means for opposing the output of said voltage divider means to the voltage drop across one arm of said bridge and for adjusting said tap until the voltage divider output equals said voltage drop; means for supplying R.F. power to be measured to said bolometric resistor and thereby unbalancing the bridge; said means for adjusting the bias power from said variable D.-C. source being further adjustable, without changing the output of the voltage divider means, until the bridge is rebalanced; means for accurately measuring directly the difference in potential across said arm of the bridge and said potentiometer; said voltage divider means including sub-divider means arranged in discrete stages corresponding to respective decimal orders and providing means for direct reading of the output voltage level established by the slider means; said bolometer resistor being comprised of two thermistor units in series forming a thermistor assembly; means for supplying R.F. power comprising a coaxial cable terminating in a supply coaxial connector; a mating coaxial connector for said bridge having a center terminal connector and a grounded outer terminal connector; a direct conductive connection between said center terminal connector and the common junction of said two series thermistor units; a separate capacitive connection between each of the remaining, noncommon sides of the thermistor assembly and said grounded outer terminal connector, whereby said thermistor units are supplied with R.F. in parallel; and a power transformer connected to a commercial low-frequency source of A.-C. power; a power pack supplied by the secondary of said power transformer to convert said low-frequency A.-C. to D.-C. for the D.-C. bias power, said power pack tending to provide a leakage circuit for low-frequency A.-C. from the transformer secondary through at least one of said thermistor units; said power transformer being of low capacitance construction to reduce capacitive leakage of low frequency A.-C. from the transformer primary to the secondary.

2. The invention according to claim 1, said low capacitance construction including physically widely spaced primary and secondary windings with an elongated magnetic core magnetically linking the two windings, but physically separating them; and an enlarged spool supporting at least one of the windings away from the magnetic core portion on which it is wound, to reduce the capacitance between the winding and the core to a negligible amount.

3. Apparatus for measuring R.F. power comprising a bridge circuit, one arm of which includes a bolometric resistor having a substantial temperature coefficient of resistivity; means for supplying D.-C. bias power to said bridge from an adjustable D.-C. source including means for adjusting the voltage from said source applied to said bridge to bring the bridge into balance; a potentiometer having an adjustable output tap; means for opposing the output of said potentiometer to the voltage drop across one arm of said bridge and means for adjusting said tap until the potentiometer output equals said voltage drop; means for supplying R.F. power to be measured to said bolometric resistor and thereby unbalancing the bridge; said means for adjusting the voltage applied from said adjustable D.-C. source being further adjustable, without changing the output of the potentiometer, to bring the bridge into rebalance; means for accurately measuring the difference in potential across said arm of the bridge and said potentiometer; a further fixed resistor equal in value to the bolometric resistor during balance; first switching means for substituting said further resistor in the bridge for the bolometric resistor during the measurement, and further means for maintaining the current through said bolometric resistor at the operating level during said substitution, to maintain the thermal stability of the bolometric resistor constant during the entire measurement.

4. The invention according to claim 3, said further means comprising second switching means operable simultaneously with said first switching means to connect said bolometric resistor in series with a resistor to the source of D.-C. bias power to maintain substantially the same current level through said bolometric resistor as during the balanced condition of the bridge.

5. Apparatus for measuring R.F. power comprising a bridge circuit, one arm of which includes a bolometric resistor means having a substantial temperature coefficient of resistivity; means for supplying D.C. bias power to said bridge from an adjustable D.-C. source; means for adjusting the voltage from said source applied to said bridge to bring the bridge into balance; a potentiometer having an adjustable output tap; means for opposing the output of said potentiometer to the voltage drop across one arm of said bridge and means for adjusting said tap until the potentiometer output equals said voltage drop; means for supplying R.F. power to be measured to said bolometric resistor and thereby unbalancing the bridge; said means for adjusting the voltage applied from said adjustable D.-C. source being further adjustable, without changing the output of the potentiometer, to bring the bridge into rebalance; said bolometric resistor means including a coaxial cable connector for connection to the source of R.F. power, said coaxial cable connector having a central terminal means and a grounded outer conductor means, two thermistor units connected directly conductively to said central terminal, said grounded outer conductor means comprising an enlarged concentric casing of substantially greater diameter than the outer diameter of a connected coaxial cable, a series of thin conductive discs within said casing concentric with said inner conductor and of a diametric extent substantially greater than the outer conductor of the coaxial cable; and means for accurately measuring the difference in potential across said arm of the bridge and said potentiometer.

References Cited by the Examiner
UNITED STATES PATENTS

| 2,775,754 | 12/1956 | Sink | 324—99 X |
| 3,047,803 | 7/1962 | Sorger | 324—106 |
| 3,142,017 | 7/1964 | Weinschel | 324—106 |

OTHER REFERENCES

Soderman, "A Bolometer Bridge for the Measurement of Power at High Frequencies," General Radio Experimenter, vol. 25, No. 2 (July 1950), pages 1–7 (pages 2–4 relied on).

WALTER L. CARLSON, *Primary Examiner.*

D. R. GREENE, J. J. MULROONEY,
*Assistant Examiners.*